United States Patent Office 2,771,960
Patented Nov. 27, 1956

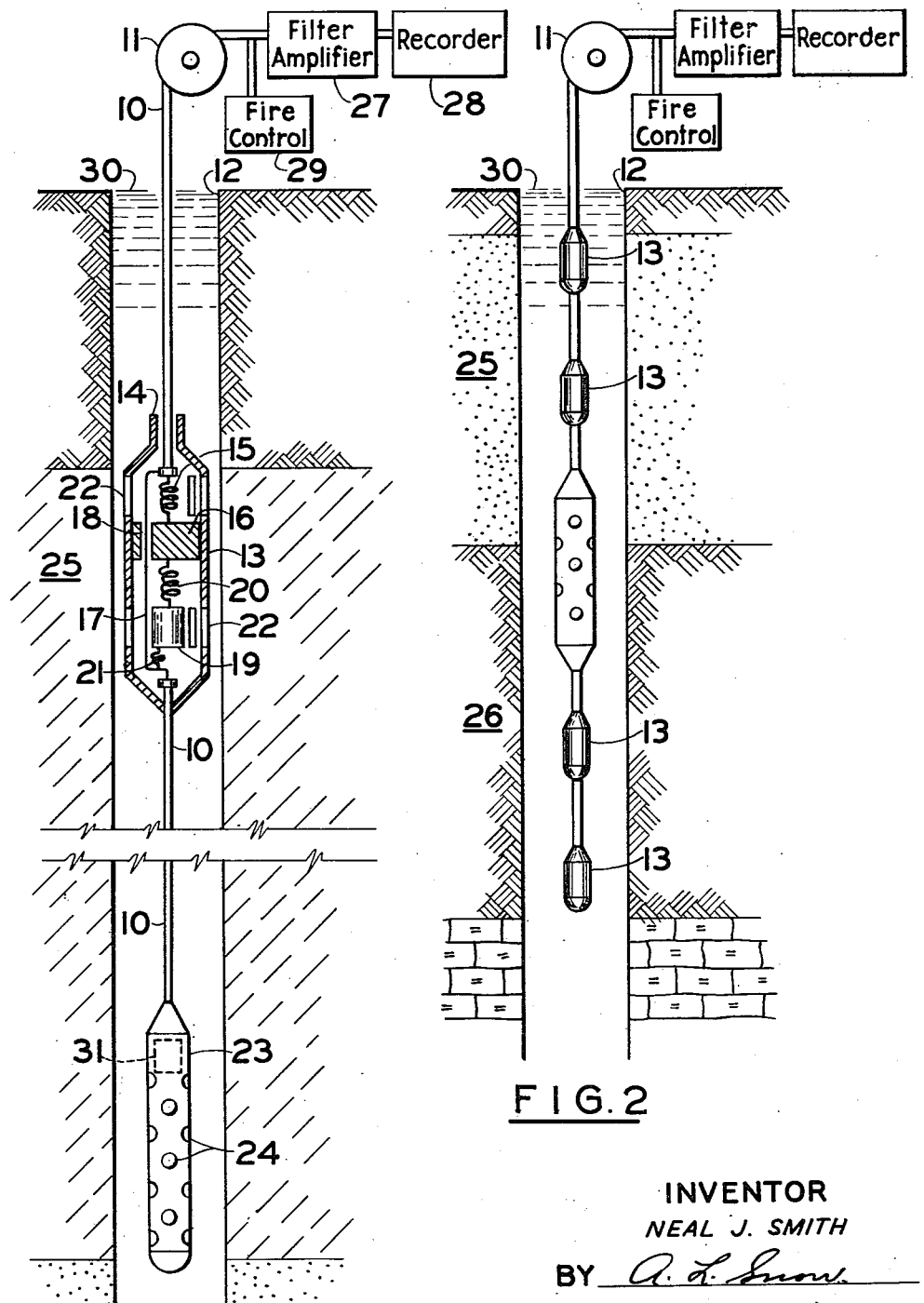

2,771,960

INTERVAL VELOCITY SEISMIC LOGGING

Neal J. Smith, New Orleans, La., assignor to California Research Corporation, San Francisco, Calif., a corporation of Delaware Application September 11, 1951, Serial No. 246,056

7 Claims. (Cl. 181—.5)

This invention relates to seismic prospecting and particularly refers to a method and apparatus for determining accurately and easily the velocity of seismic waves through specific formations that are penetrated by a well bore.

Heretofore, in determining velocity of seismic waves through a given formation or interval surrounding a well bore, it has been the practice to detonate an explosive at the bottom of the well bore or at or near the surface of the well bore and measure the rate at which the sound traveled to a seismograph spaced from the source of seismic waves by a known distance. Knowing also the time of detonating the explosion and the arrival time of the wave through the formation under investigation, it is possible to compute the average speed of travel. This information is of great value in correcting the information gained in surface seismic exploration, when both the explosive and the seismograph pickup units are at, or very near, the surface of the earth and seismic reflections are received from subsurface formations.

Attempts that have been made to determine interval velocities in deep well bores, over about 3000–4000 feet, have not been successful, due to attenuation of the seismic energy passing through the formation to the seismometer and also to the arrival of undesired seismic waves ahead of the desired one that passes through the formation in question. If both the explosive charge and the seismometer, for example, are suspended by the same metal cable, the vibrations passing along the latter will arrive at the pickup unit ahead of those passing through the formation, and will so mask the latter that their arrival time cannot be distinguished. Also, the time required for lowering and raising the equipment throughout a deep bore hole, and the risk of losing it therein are serious disadvantages. As a consequence, although many proposals have been made for measuring interval velocities, such measurements have not been carried out to any great extent.

This invention comprehends broadly a method and means for determining interval velocities throughout a deep bore hole that traverses the formations to be investigated, involving the control of the initial direction of the explosion force against the formation surrounding the bore hole and the suppression of the rapidly traveling seismic wave that unavoidably passes along the equipment-supporting cable. Additionally, means are provided to fire a succession of directed explosive shots in a controllable manner so that a number of velocity determinations can be made for a given interval of formation, or several formations can be surveyed in succession without removing the equipment from the well bore.

It is an object of this invention to provide a method and apparatus for seismic interval velocity logging in a well bore, involving a controlled direction of the initial impulse from the explosion, the major force being exerted against a segment of the formation and substantially at right angles thereto, instead of being dissipated in all directions.

Another object is to provide a method and means for insuring that the desired seismic waves which travel from the source of the seismic shock to the seismometer or seismometers which detect the waves will not be obscured or preceded by vibrations traveling along the cable or other suspending means for the detecting units.

Another object is to provide a novel combination of apparatus for interval velocity logging which can be controlled from the top of the well bore to give repeated seismic shocks due to controlled explosions, so that successive formations throughout the well, totalling many thousands of feet, may be surveyed at one traverse of the equipment.

These and other objects and advantages will be further apparent from the following description of a preferred embodiment of the invention, taken with the attached drawing which forms a part of this specification.

In the drawing, Figure 1 is a diagrammatic cross-section of a number of formations in the earth taken through a well and shows a simple and generally preferred arrangement for practicing the method of this invention. Figure 2 is a similar view, showing an alternative arrangement of apparatus, using a plurality of seismometers, spaced both above and below the elastic wave generator, for purposes which will be described.

Referring to Figure 1, reference numeral 10 designates an insulated, multi-conductor electric cable passing over a hoisting means generally designated 11 and adapted to be raised and lowered in well bore 12. Intermediate the ends of cable 10 is a casing 13 for supporting a seismic detector or pickup unit in a particular manner, as will be described in more detail.

One of the objects of this invention is to suppress, if not entirely to prevent, transmission of vibrations or shock waves along cable 10. To this end, casing 13 is provided at its upper end with means forming an enlarged opening 14 so that the cable is not in contact but is spaced from the casing at that point. Inside of casing 13 and connected to cable 10 is a resilient means such as a spring 15 having relatively low natural frequency, for example about 0.5 to 4 cycles per second. The other end of spring 15 is fastened to a heavy mass or weight 16 secured within casing 13, for example, at a point intermediate its ends. In this example, casing 13 is made of relatively light metal, the mass or weight 16 being secured therein. If desired, the equivalent of the mass 16 may be formed by the cable shell with equally good results. A very flexible or "limp" multi-conductor cable section 17 passes through the length of casing 13, traversing freely through weight 16 by a passage 18, provided for that purpose. Section 17 thus connects electrically the upper and the lower sections of cable 10 but is of such construction as to transmit a minimum of mechanical vibration between those sections.

The seismometer or pickup unit 19 is suspended in casing 13 from a low-frequency spring 20 connected either to the lower face of weight 16 or to another part of the casing. Weight 16 and casing 13 are either made integral or are rigidly secured together, so that it is not material which acts directly as a support for the spring 20. A short length of flexible or "limp" conductor 21 connects the winding of seismometer 19 to the appropriate conductors in section 17. Both conductors 17 and 21 are designed to transmit as little mechanical vibration as possible to the respective elements that they connect for reasons which will be apparent. A plurality of ports or slots 22 in the upper and lower chambers of the casing 13 permit access of well fluids, usually drilling mud 30 to the interior of the casing 13 so that seismic waves from the formation may reach the seismic detector 19.

The general arrangement of the seismometer support or casing 13 just described is claimed in a copending application of G. A. Schurman, Serial No. 212,218, both that application and this being assigned to a common assignee.

Suspended below detector casing 13 a predetermined distance, for example 500–1000 feet, by means of the lower section of cable 10, is a particular type of seismic wave generator generally designated 23. Cavities 24 extending radially inwardly from its outer face are designed to contain separate explosive charges, in the manner commonly used in gun perforators. Indeed, a convenient generator unit for this purpose is a gun perforator of the type shown in U. S. Patents 2,062,974 or 2,142,583, provided with a selectively operable firing control means such as are shown in U. S. Patents 2,331,058 or 2,343,087. Desirably, but not necessarily, blank explosive charges without projectiles are placed in cavities 24. Alternatively, shaped charges of explosives such as are described in U. S. Patent 2,399,211 or 2,494,256 can equally well be employed.

In operation, the apparatus described is lowered in the well bore to the desired location, for example with detector unit 13 at the upper portion and the seismic shock generator 23 at the lower portion of a formation 25. One or more shots are fired from the cavities 24 of generator 23, the initial explosion wave or impulse traveling outwardly therefrom to impinge directly upon a segment of the formation 25 oppositely the cavity. This shock is imparted directly to the formation, and travels therein in a well-known manner until it reaches the location of the detector unit 13 whereupon it actuates the seismometer 19 to give a signal which is transmitted through the upper section of cable 10 to the surface of the earth, where the signal is converted to a desired amplitude and frequency in the amplifier-filter 27 and is suitably charted by recorder 28. The seismic generator fire control unit 29 is connected to the system just described so that the time interval between the firing of the explosive in cavity 24 to initiate the seismic wave, and its arrival at the seismometer 19 is determinable from the chart produced by recorder 28.

Alternatively, it may not always be necessary to make a direct electrical connection between recorder 28 and fire control unit 29, because of the inductive coupling in multi-conductor cable 10 between those conductors of the group leading from unit 29 to the seismic generator 23 and those conductors or the conductor leading to the seismometer 19. The electrical impulse that fires the explosive will ordinarily be picked up inductively in the detector circuit and will be clearly indicated on the chart of recorder 28 ahead of the record of arrival of the signal from 19. A further desirable modification, if sufficient conductor groups are available in cable 10, for obtaining the exact instant of the explosion, is to place a shot-indicating or second seismometer 31 in mechanical contact with the seismic generator 23, for example as being within its casing, so that the jar of recoil of each explosion will give an independent record on the chart.

Any convenient method of determining the respective locations of the seismic generator 23 and the detector unit or units 19 in the well bore may be employed, care being taken to prevent tangling or shortening of the lower section of cable 10 connecting the two units. The usual precautions should be taken for accuracy of location of the surveying equipment with respect to the specific formations being studied by means well known in the art, including mechanical measurement of the cable 10, identification of formations by radio-active markers, electric logs, and the like.

It has been found that, by the use of the steps just described, the interval velocity log of a number of formations can readily and quickly be made, using the novel combination of apparatus, most of the components of which are available in well surveying and completing operations.

The arrangement of Figure 2 shows one alternative of the invention, in which two seismometer casings 13 are disposed above and two added units are placed below the seismic shock generator 23. By such an arrangement, check readings may be made in case of failure of one seismometer unit 19, or both upper formation 25 and lower formation 26 may be investigated at the same time, or differences in arrival times at the detector groups may be measured. The arrangement of the casings 13 in any of the combinations possible with this invention is very flexible. For example, in Figure 1, the casing 13 may be inverted from the position shown. In Figure 2 similar modifications could likewise be made.

In conclusion, it will be understood that, although only specific procedures and arrangements for carrying out this invention have been described and illustrated, numerous changes and alterations in the apparatus, as well as in the steps of the method, could be carried out without departing therefrom, and all such modifications that fall within the scope of the appended claims are considered to be embraced thereby.

I claim:

1. An apparatus for determining the velocity of an elastic wave through a subsurface formation penetrated by a well bore, comprising, in combination, a generator for elastic waves having an approximately radially extending cavity for explosive facing a segment of said well bore, a cable for suspending said generator at a predetermined point in said well bore, a seismometer suspended by said cable, and an elastic wave absorber between said generator and said seismometer.

2. An apparatus according to claim 1, in which a plurality of seismometers are spaced along said cable, said elastic wave absorber being interposed between said generator and that seismometer nearest thereto.

3. An apparatus for determining the velocity of an elastic wave through a subsurface formation penetrated by a well bore, comprising, in combination, a generator for elastic waves having a plurality of cavities for explosive charges facing the wall of said well bore, a multi-conductor cable for suspending said generator at a predetermined point in said well bore, a seismometer suspended on said cable at a predetermined distance from said generator and connected to a group of conductors in said cable, means for attenuating the passage of mechanical vibrations along said cable between said generator and said seismometer, a signal recorder connected to those conductors of said cable which are connected to said seismometer, and an electrical firing control means for selectively detonating explosive charges carried by said generator, said control means being connected to another group of conductors of said cable, so constructed and arranged that an electrical impulse for firing an explosive charge induces a signal in said seismometer conductors to produce a record preceding that due to a seismic wave traversing said formation from the explosion of said charge.

4. An apparatus for determining the velocity of an elastic wave through a surface formation penetrated by a well bore, comprising, in combination, a generator for elastic waves having at least one approximately radially extending cavity for explosive facing the wall of said well bore, a cable for suspending said generator at a predetermined point in said well bore, a first seismometer suspended by said cable at a predetermined distance from said generator for receiving elastic waves passing through said formation, an elastic wave absorber between said generator and said first seismometer, and a second seismometer mechanically coupled to said elastic wave generator.

5. An apparatus according to claim 4 with the addition of a recorder connected to said cable for indicating the response of said second seismometer to the detonation of an explosive in said generator, and the response of said first seismometer to the arrival of a seismic wave produced in said formation by said detonation.

6. An apparatus for determining the velocity of an elastic wave through a subsurface formation penetrated by a well bore comprising, in combination, a generator for elastic waves having a cavity for explosive facing a segment of said well bore, a cable for suspending said generator at a predetermined point in said well bore, a seismometer suspended by said cable, an elastic wave absorber between said generator and said seismometer, said generator being provided with a plurality of cavities, each adapted to contain a single explosive charge, and with the addition of means controllable from the top of said well for exploding said charges in predetermined sequence.

7. An apparatus for determining the velocity of an elastic wave through a subsurface formation penetrated by a well bore, comprising, in combination, a generator for elastic waves having an approximately radially extending cavity for explosive facing a segment of said well bore, a cable for suspending said generator at a predetermined point in said well bore, a seismometer suspended by said cable, and means for attenuating the passage of mechanical vibrations along said cable between said generator and said seismometer.

References Cited in the file of this patent

UNITED STATES PATENTS

| | | |
|---|---|---|
| 2,088,588 | Dudley | Aug. 3, 1937 |
| 2,191,119 | Schlumberger | Feb. 20, 1940 |
| 2,191,120 | Slichter | Feb. 20, 1940 |
| 2,207,281 | Athy et al. | July 9, 1940 |
| 2,233,992 | Wyckoff | Mar. 4, 1941 |
| 2,494,256 | Muskat et al. | Jan. 10, 1950 |
| 2,506,836 | Kaltenberger | May 9, 1950 |
| 2,596,023 | Globe et al. | May 6, 1952 |
| 2,651,027 | Vogel | Sept. 1, 1953 |
| 2,679,205 | Piety | May 25, 1954 |